(12) United States Patent
Sorenson et al.

(10) Patent No.: US 10,731,003 B2
(45) Date of Patent: Aug. 4, 2020

(54) BENZOXAZINE COMPOSITION

(71) Applicant: 3M INNOVATIVE PROPERTIES COMPANY, St. Paul, MN (US)

(72) Inventors: Gregory P. Sorenson, Maplewood, MN (US); Ilya Gorodisher, Stillwater, MN (US); Robert J. Webb, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/323,568

(22) PCT Filed: Sep. 14, 2017

(86) PCT No.: PCT/IB2017/055567
§ 371 (c)(1),
(2) Date: Feb. 6, 2019

(87) PCT Pub. No.: WO2018/051268
PCT Pub. Date: Mar. 22, 2018

(65) Prior Publication Data
US 2019/0169370 A1     Jun. 6, 2019

Related U.S. Application Data

(60) Provisional application No. 62/394,929, filed on Sep. 15, 2016.

(51) Int. Cl.
*C08G 73/02* (2006.01)
*C08G 14/06* (2006.01)
*C09D 161/34* (2006.01)

(52) U.S. Cl.
CPC ......... *C08G 73/0233* (2013.01); *C08G 14/06* (2013.01); *C09D 161/34* (2013.01)

(58) Field of Classification Search
CPC ........ C08G 14/06; C08G 14/04; C08G 14/00; C08G 14/12; C08G 73/02; C08G 73/22; C08G 73/0233; C08L 79/04; C09D 161/34
See application file for complete search history.

(56) References Cited

U.S. PATENT DOCUMENTS

| | | | |
|---|---|---|---|
| 3,018,262 A | 1/1962 | Schroeder | |
| 3,298,998 A | 1/1967 | McConnell | |
| 3,496,250 A | 2/1970 | Czerwinski | |
| 5,462,797 A | 10/1995 | Williams | |
| 5,543,516 A | 8/1996 | Ishida | |
| 6,207,786 B1 | 3/2001 | Ishida | |
| 6,376,080 B1 | 4/2002 | Gallo | |
| 7,041,772 B2 | 5/2006 | Aizawa | |
| 7,053,138 B2 | 5/2006 | Magendie | |
| 7,517,925 B2 | 4/2009 | Dershem | |
| 2011/0054100 A1 | 3/2011 | Gorodisher | |
| 2012/0058069 A1* | 3/2012 | Taden | C08G 73/02 424/70.11 |

FOREIGN PATENT DOCUMENTS

| | | |
|---|---|---|
| EP | 0022148 | 1/1981 |
| EP | 2314579 | 4/2011 |
| WO | WO 2000-00535 | 1/2000 |
| WO | WO 2010-141396 | 12/2010 |
| WO | WO 2012-018753 | 2/2012 |
| WO | WO 2012-134731 | 10/2012 |
| WO | WO 2012-135180 | 10/2012 |
| WO | WO 2013-048851 | 4/2013 |
| WO | WO 2014-052255 | 4/2014 |
| WO | WO 2014-105422 | 7/2014 |
| WO | WO 2014-179100 | 11/2014 |
| WO | WO 2015-057414 | 4/2015 |
| WO | WO 2016-200557 | 12/2016 |
| WO | WO 2018-042290 | 3/2018 |

OTHER PUBLICATIONS

Deetlefs, "Neoteric Optical Media for Refractive Index Determination of Gems and Minerals", New Journal of Chemistry, 2006, vol. 30, pp. 317-326.

Fei, "Influence of Elemental Iodine on Imidazolium-Based Ionic Liquids: Solution and Solid-State Effects", Inorganic Chemistry, 2015, vol. 54, pp. 10504-10512.

Gao, "Iridium-Catalyzed Asymmetric Hydrogenation of 3-Substituted 2H-1,4-Benzoxazines", Advanced Synthesis & Catalysis, 2012, vol. 354, pp. 483-488, XP002775612.

Ghammany, "Synthesis and Characterization of Two New Halo Complexes of Iodine: $(C_4H_9)_4N[I_2Br]$ and $(C_4H_9)_4N[I_2Cl]$ and Theoretical Calculations of Their Structures", Main Group Chemistry, 2009, vol. 08, No. 04, pp. 299-306.

Ghosh, "Polybenzoxazine—New High Performance Thermosetting Resins: Synthesis and Properties", Progress in Polymer Science, 2007, vol. 32, pp. 1344-1391.

Kimura, "New Thermosetting Resin from Bisphenol A-based Benzoxazine and Bisoxazoline", Journal of Applied Polymer Science, 1999, vol. 72, pp. 1551-1558.

Neuse, "Ferricenium Polyiodides", Journal of Organometallic Chemistry, 1985, vol. 286, Issue 03, pp. 329-341.

(Continued)

*Primary Examiner* — Shane Fang

(57) ABSTRACT

The disclosure provides a catalyst for use with a benzoxazine resins which imparts accelerated curing at reduced temperatures. The catalyst is selected from elemental halogen or onium polyhalide compounds.

19 Claims, No Drawings

(56) References Cited

OTHER PUBLICATIONS

Rimdusit, "Development of New Class of Electronic Packaging Materials Based on Ternary Systems of Benzoxazine, Epoxy, and Phenolic Resins", Polymer, 2000, vol. 41, pp. 7941-7949.
International Search Report for PCT International Application No. PCT/IB2017/055567, dated Nov. 24, 2017, 5 pages.

* cited by examiner

BENZOXAZINE COMPOSITION

CROSS REFERENCE TO RELATED APPLICATIONS

This application is a national stage filing under 35 U.S.C. 371 of PCT/IB2017/055567, filed Sep. 14, 2017, which claims the benefit of U.S. Application No. 62/394,929, filed Sep. 15, 2016, the disclosure of which is incorporated by reference in its/their entirety herein.

FIELD OF THE INVENTION

The present invention relates to benzoxazine resin compositions and more particularly to a catalyst for use with a benzoxazine resin, which imparts accelerated curing at reduced temperatures.

BACKGROUND

Benzoxazines and compositions containing benzoxazine are known (see, for example, U.S. Pat. Nos. 5,543,516 and 6,207,786 to Ishida et al.; S. Rimdusit and H. Ishida, "Development of New Class of Electronic Packaging Materials Based on Ternary Systems of Benzoxazine, Epoxy, and Phenolic Resins", Polymer, 41, 7941-49 (2000); and H. Kimura et al., "New Thermosetting Resin from Bisphenol A-based Benzoxazine and Bisoxazoline", J. App. Polym. Sci., 72, 1551-58 (1999).

U.S. Pat. No. 7,517,925 (Dershem et al.) describes benzoxazine compounds and thermosetting resin compositions prepared therefrom. The compositions are said to be useful for increasing adhesion at interfaces within microelectronic packages and low shrinkage on cure and low coefficient of thermal expansion (CTE).

U.S. Pat. No. 7,053,138 (Magendie et al.) describes compositions comprising benzoxazines and thermoplastic or thermoset resins in the manufacture of prepregs and laminates. The compositions are said to yield flame-proofed laminating resins that have high glass transition temperatures.

U.S. Pat. No. 6,376,080 (Gallo) describes a method of preparing a polybenzoxazine which includes heating a molding composition including a benzoxazine and a heterocyclic dicarboxylic acid to a temperature sufficient to cure the molding composition, thereby forming the polybenzoxazine. The compositions are said to have near-zero volume change after post cure.

U.S. Pat. No. 6,207,786 (Ishida et al.) states that the polymerization of benzoxazine monomers to a polymer is believed to be an ionic ring opening polymerization which converts the oxazine ring to another structure, e.g., linear polymer or larger heterocyclic rings. It is thought that a chain transfer step(s) limits the molecular weight of the resulting polymer and causes some branching. FTIR (Fourier transform infrared) analysis is often used to monitor the conversion of the oxazine rings to polymers to provide an estimate of the rate of polymerization at different temperatures. NMR (nuclear magnetic resonance) spectroscopy can also be used to monitor conversion of benzoxazine monomers to polymer.

Epoxy adhesives have been widely used in structural adhesive applications and satisfy many demanding industrial applications. However epoxies have many noted deficiencies that limit their use including limited high temperature stability, high moisture uptake, shrinkage, and a large exotherm on polymerization.

Polybenzoxazines have been proposed to overcome many of the limitations on epoxies. They have lower exotherms on curing, less shrinkage, have higher thermal stability, low byproducts and may be readily prepared from benzoxazines, which in turn, are readily prepared from an amine, formaldehyde and a phenol in high yields. However, current methods of preparing polybenzoxazines require relatively high temperatures, and typically produce brittle, highly crosslinked polymers.

Efforts to reduce the polymerization temperature have included the addition of various phenols or Lewis acid accelerators, or copolymerization of the benzoxazine with epoxides or other monomers such as phenol-formaldehyde. However the resultant polybenzoxazines-epoxy hybrids retain many of the limitations of the epoxies, and compromise many desirable features thereof, such as epoxy toughness.

SUMMARY

The present invention is directed to a catalyzed benzoxazine resin composition containing a thermosettable benzoxazine resin and a catalyst comprising an elemental halide or a quaternary ammonium polyhalide compound.

The present disclose provides a curable composition comprise a benzoxazine compound and a catalyst comprising an elemental halide or an onium polyhalide compound.

The curable composition may be cured to produce cured compositions useful in coating, sealants, adhesive and many other applications. The present disclosure further provides a curable composition comprising a benzoxazine compound and an ammonium catalyst, which when cured, is useful in high temperature structural adhesive applications. The present disclosure further provides a method of preparing a polybenzoxazine comprising heating the curable composition at a temperature, and for a time sufficient, to effect polymerization.

The present disclosure provides a method of preparing poly(benzoxazine) polymers by combining a benzoxazine compound and a catalyst comprising an onium polyhalide.

In one embodiment, the present disclosure provides a polymerizable composition including: a benzoxazine; an onium catalyst; and a film-forming material, an optional co-catalyst, a curative, or a combination thereof. In certain embodiments, a polymerizable composition can further include a toughener (i.e., toughening agent), an epoxy resin, a reactive diluent, or combinations thereof.

The present disclosure overcomes many of the deficiencies noted for the polymerization of polybenzoxazines including lower polymerization temperatures and reduced exotherms. In some embodiments, the product polybenzoxazines are flexible solids having good thermal stability, and are useful for many industrial applications.

As used herein, the term "benzoxazine" is inclusive of compounds and polymers having the characteristic benzoxazine ring. In the illustrated benzoxazine group, R is the residue of a mono- or polyamine.

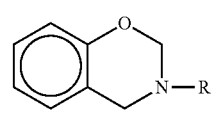

I

As used herein "polybenzoxazine" refers to a compound having two or more benzoxazine rings.

As used herein "poly(benzoxazine)" refers to the polymer resulting from ring-opening polymerization of benzoxazine or polybenzoxazine compounds.

As used herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

As used herein, the term "heteroalkyl" includes both straight-chained, branched, and cyclic alkyl groups with one or more heteroatoms independently selected from S, O, and N both unsubstituted and substituted alkyl groups. Unless otherwise indicated, the heteroalkyl groups typically contain from 1 to 20 carbon atoms. "Heteroalkyl" is a subset of "hetero(hetero)hydrocarbyl" described below. Examples of "heteroalkyl" as used herein include, but are not limited to, methoxy, ethoxy, propoxy, 3,6-dioxaheptyl, 3-(trimethylsilyl)-propyl, 4-dimethylaminobutanyl, and the like. Unless otherwise noted, heteroalkyl groups may be mono- or polyvalent.

As used herein, "aryl" is an aromatic group containing 6-18 ring atoms and can contain fused rings, which may be saturated, unsaturated, or aromatic. Examples of an aryl group include phenyl, naphthyl, biphenyl, phenanthryl, and anthracyl. Heteroaryl is aryl containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent.

As used herein, "(hetero)hydrocarbyl" is inclusive of (hetero)hydrocarbyl alkyl and aryl groups, and hetero(hetero)hydrocarbyl heteroalkyl and heteroaryl groups, the later comprising one or more catenary oxygen heteroatoms such as ether or amino groups. Hetero(hetero)hydrocarbyl may optionally contain one or more catenary (in-chain) functional groups including ester, amide, urea, urethane and carbonate functional groups.

Unless otherwise indicated, the non-polymeric (hetero) hydrocarbyl groups typically contain from 1 to 60 carbon atoms. Some examples of such (hetero)hydrocarbyls as used herein include, but are not limited to, methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", "aryl" and "heteroaryl" supra.

As used herein, the term "residue" is used to define the (hetero)hydrocarbyl portion of a group remaining after removal (or reaction) of the attached functional groups, or the attached groups in a depicted formula. For example, the "residue" of butyraldehyde, $C_4H_9$—CHO is the monovalent alkyl $C_4H_9$—. The residue of phenylene diamine $H_2N$—$C_6H_4$—$NH_2$, is the divalent aryl —$C_6H_4$—.

DETAILED DESCRIPTION

The present invention is directed to a catalyzed benzoxazine resin composition containing a thermosetting benzoxazine resin and a catalyst comprising an elemental halogen or a quaternary ammonium polyhalide compound.

The catalyst may be a onium polyhalide of the general formula:

where $1 \leq n \leq 4$,
Q is onium group, selected from ammonium, sulfonium and phosphonium; and
X is a halide. Each X may be the same or different and may include mixed halides such a $X=Br_2Cl$ or $Cl_2Br$.

In some embodiments Q may be selected from quaternary amines of the formula: $(R^1)_4N^+$, sulfonium groups of the formula $(R^1)_3S^+$ or phosphonium groups of the formula $(R^1)_4P^+$ wherein each $R^1$ is independently H, alkyl, aryl, or combinations thereof with the proviso that no more than one $R^1$ is H.

In some alternate embodiments, Q may be selected from organometallic cations such as are described in U.S. Pat. No. 5,462,797 (Williams et al.), incorporated herein by reference. One preferred organometallic cation is ferrocenium.

In some embodiment Q may be an ammonium group selected from pyrrolidinium, pyridinium or imidazolinium groups of the formulas.

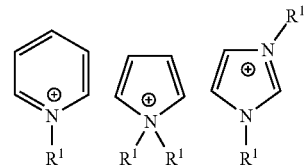

wherein each $R^1$ is independently H, alkyl, aryl, or combinations thereof with the proviso that no more than one $R^1$ is H.

Preferably, Q may be selected from quaternary amines of the formula:

wherein each $R^1$ is independently H, alkyl, aryl, or combinations thereof with the proviso that no more than one R1 is H.

Examples of the quaternary ammonium polyhalides that can be used as cathode-active materials in the present invention include tetramethylammonium trichloride, tetramethylammonium tribromide, tetramethylammonium chlorodibromide, tetrainethylammonium iododibromide, tetraethylammonium trichloride, tetraethylammonium tribromide, and tetraethylammonium chlorodibromide.

The quaternary ammonium polyhalides are made by adding molecular iodine bromine or chlorine or bromine chloride to a quaternary ammonium halide salt. Reference may be made to S. Ghammany et al., Synthesis and characterization of two new halo complexes of iodine:$(C_4H_9)_4N[I_2Br]_7$ and $(C_4H_9)_4N[I_2Cl]_7$ and theoretical calculations of their structures, Main Group Chemistry, vol. 8, No. 4, December 2009, 299-306.

In some known methods, the onium polyhalides may be made by aqueous techniques by adding $I_2$, $Cl_2$, $Br_2$ (or mixed halides) to a concentrated aqueous solution of the appropriate quaternary ammonium halide salt. The amount of water used should be sufficient to dissolve all of the quaternary ammonium halide salt, but should be otherwise kept at a minimum to prevent yield losses due to the solubility of the product in water. The bromine should be added at a rate sufficiently slow to prevent excess bromine from pooling on the bottom of the reaction vessel during the initial stages of the reaction. The quaternary ammonium polyhalide separates from the solution as a deep red liquid layer. The temperature of the reaction should be sufficient to keep the polyhalide liquid, but below the temperature at which bromine is released from the complex. A suitable temperature range is from about 10° C. to about 90° C.

Imidazolium polyhalides may be prepared by mixing an imidazolium halide with an $I_2$, $Cl_2$ or Br2 as described in M. Deetlefs et al., *Neoteric optical media for refractive index determination of gems and minerals*, New Journal of Chemistry, 2006, 30, 317-326.

The preparation of onium polyiodides may be prepared by a similar procedure described in P. Dyson et al., *Influence of Elemental Iodine on Imidazolium-Based Ionic Liquids: Solution and Solid-State Effects*, Inorg. Chem., 2015, 54, 10504-10512. DOI 10.1021/acs.inorgchem.5b02021.

Methods for preparation of the quaternary ammonium halide salt precursors are known to those skilled in the art. The primary methods are by reaction of tertiary amine with an appropriate alkyl halide, halogenated alkyl ether, or epoxide in the presence or absence of a solvent. The reaction of tertiary amines with epoxides in aqueous media produces a quaternary ammonium hydroxide which is then neutralized with mineral acid (H—X) to give the quaternary ammonium halide. The halide ion X– which complexes with bromine to form the polyhalide ion $XBr_2$— is determined in this case by the mineral acid H—X used to neutralize the reaction. If the quaternary ammonium halide salt is prepared in an aqueous solution the polyhalide may be prepared directly using the aqueous solution without isolation of the quaternary ammonium salt intermediate.

In a typical preparation, an aqueous solution of the tertiary amine is vigorously stirred with a stoichiometric amount of alkyl halide, the latter being present as a second liquid layer. The time required for complete reaction is dependent upon the nature of the alkyl halide and increases in the order R—I<R—Br<R—Cl. A sealed reaction vessel may be used to prevent loss of volatile reagents in the event that temperatures above the boiling point of the reagents are needed. The reaction is complete when the alkyl halide is consumed and is indicated by the disappearance of the second liquid layer from the reaction vessel.

The elemental halogen, or the quaternary ammonium polyhalide is generally used in amounts of 0.1 to 20% by mass relative to the total composition, preferably in amounts of 0.5 to 10% by mass In the preparation of the polybenzoxazine, any benzoxazine compound derived from an amine may be used. Benzoxazines may be prepared by combining a phenolic compound, and aliphatic aldehyde, and a primary amine compound, such as aniline. U.S. Pat. No. 5,543,516 (Ishida) and U.S. Pat. No. 7,041,772 (Aizawa et al.) hereby incorporated by reference, describe methods of forming benzoxazines. Other suitable reaction schemes to produce mono-, di- and higher-functional benzoxazines are described in N. N. Ghosh et al., *Polybenzoxazine-new high performance thermosetting resins: synthesis and properties, Prog. Polym. Sci.* 32 (2007), pp. 1344-1391.

One suitable method of producing the starting benzoxazine compounds is illustrated by the following reaction scheme:

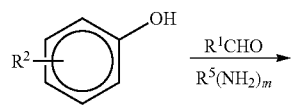

II

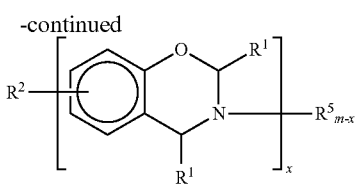

wherein each $R^1$ is H or an alkyl group, and is the residue of an aliphatic aldehyde, $R^2$ is H, a covalent bond, a phenol or a polyvalent (hetero) hydrocarbyl group, preferably H, a covalent bond or a divalent alkyl group; with the proviso that $R^2$ is not H when x>1.

$R^5$ is (hetero)hydrocarbyl residue of a primary amino compound, $R^5(NH_2)_m$, where m is 1-4; and x is at least 1. It will be appreciated that as the $R^2$ group may be part of a polyphenolic compound, said $R^2$ group may bond to another benzoxazine ring as illustrated in Formula IV below. Similarly, as the $R^5$ may be derived from a polyamine, the $R^5$ may also be bonded to another benzoxazine ring as illustrated in Formula II supra. In the preparation of the starting benzoxazine, mono- or polyphenolic compounds may be used. The phenolic compound may be further substituted without limitation is desired.

For example, the 3, 4, and 5 positions of the phenolic compound may be hydrogen or substituted with other suitable substituents such as alkyl, cycloalkyl, heterocycloalkyl, aryl, heteroaryl, aralkyl, heteroaralkyl, alkoxy, alkoxyalkylene, hydroxylalkyl, hydroxyl, haloalkyl, carboxyl, halo, amino, aminoalkyl, alkylcarbonyloxy, alkyloxycarbonyl, alkylcarbonyl, alkylcarbonylamino, aminocarbonyl, alkylsulfonylamino, aminosulfonyl, sulfonic acid, or alkylsulfonyl. Desirably at least one of the positions ortho to the hydroxyl group is unsubstituted to facilitate benzoxazine ring formation.

The aryl ring of the phenolic compound may be a phenyl ring as depicted, or may be selected from naphthyl, biphenyl, phenanthryl, and anthracyl. The aryl ring of the phenolic compound may further comprise a heteroaryl ring containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl.

Examples or mono-functional phenols include phenol; cresol; 2-bromo-4-methylphenol; 2-allyphenol; 4-aminophenol; and the like. Examples of difunctional phenols (polyphenolic compounds) include phenolphthalein; biphenol; 4-4'-methylene-di-phenol; 4-4'-dihydroxybenzophenone; bisphenol-A; 1,8-dihydroxyanthraquinone; 1,6-dihydroxnaphthalene; 2,2'-dihydroxyazobenzene; resorcinol; fluorene bisphenol; and the like. Examples of trifunctional phenols comprise 1,3,5-trihydroxy benzene and the like.

The aldehyde reactants used in preparing the benzoxazine starting materials include formaldehyde; paraformaldehyde; polyoxymethylene; as well as aldehydes having the general formula $R^1CHO$, where $R^1$ is H or an alkyl group, including mixtures of such aldehydes, desirably having from 1 to 12 carbon atoms. The $R^1$ group may be linear or branched, cyclic or acyclic, saturated or unsaturated, or combinations thereof. Other useful aldehydes include crotonaldehyde; acetaldehyde; propionaldehyde; butyraldehyde; and heptaldehyde.

Amino compounds useful in preparing the starting benzoxazine can be substituted or unsubstituted, mono-, disubstituted or higher (hetero)hydrocarbyl amines having at least one primary amine group. The amines may be aliphatic or aromatic amines. It can be substituted, for example, with groups such as alkyl, cycloalkyl, heterocycloalkyl, aryl, heteroaryl, aralkyl, or heteroaralkyl.

Amines useful in the preparation of the starting benzoxazine compounds include those of the formula $R^5(NH_2)_m$ include (hetero)hydrocarbyl monoamines and polyamines. $R^5$ may be a (hetero)hydrocarbyl group that has a valence of m, and is the residue of a mono-, di- or higher amine having at least one primary amine group. $R^5$ can be an alkyl, a cycloalkyl or aryl and m 1 to 4. The $R^5$ is preferably selected from mono- and polyvalent (hetero)hydrocarbyl (i.e., alkyl and aryl compounds having 1 to 30 carbon atoms, or alternatively (hetero)hydrocarbyl including heteroalkyl and heteroaryl having 1 to twenty heteroatoms of oxygen). In some embodiments, $R^5$ is a poly(alkyleneoxy) group, such as a poly(ethyleneoxy), poly(propyleneoxy) or poly(ethyleneoxy-co-propyleneoxy) group.

In one embodiment, $R^5$ comprises a non-polymeric aliphatic, cycloaliphatic, aromatic or alkyl-substituted aromatic moiety having from 1 to 30 carbon atoms. In another embodiment, $R^5$ comprises a polymeric polyoxyalkylene, polyester, polyolefin, poly(meth)acrylate, polystyrene or polysiloxane polymer having pendent or terminal reactive —$NH_2$ groups. Useful polymers include, for example, amine-terminated oligo- and poly-(diaryl)siloxanes and (dialkyl)siloxane amino terminated polyethylenes or polypropylenes, and amino terminated poly(alkylene oxides). Useful polyamines also include polydialkylsiloxanes with pendent or terminal amino groups.

Any primary amine may be employed. Useful monoamines include, for example, methyl-, ethyl-, propyl-, hexyl-, octyl, dodecyl-, dimethyl-, methyl ethyl-, and aniline. The term "di-, or polyamine," refers to organic compounds containing at least two primary amine groups. Aliphatic, aromatic, cycloaliphatic, and oligomeric di- and polyamines all are considered useful in the practice of the invention. Representative of the classes of useful di- or polyamines are 4,4'-methylene dianiline, 3,9-bis-(3-aminopropyl)-2,4,8,10-tetraoxaspiro[5,5]undecane, and polyoxyethylenediamine. Useful diamines include N-methyl-1,3-propanediamine; N-ethyl-1,2-ethanediamine; 2-(2-aminoethylamino)ethanol; pentaethylenehexaamine; ethylenediamine; N-methylethanolamine; and 1,3-propanediamine.

Examples of useful polyamines include polyamines having at least two amino groups, wherein at least one of the amino groups are primary, and the remaining may be primary, secondary, or a combination thereof. Examples include $H_2N(CH_2CH_2NH)_{1-10}H$, $H_2N(CH_2CH_2CH_2CH_2NH)_{1-10}H$, $H_2N(CH_2CH_2CH_2CH_2CH_2CH_2NH)_{1-10}H$, $H_2N(CH_2)_3NHCH_2CH=CHCH_2NH(CH_2)_3NH_2$, $H_2N(CH_2)_4NH(CH_2)_3$ $NH_2$, $H_2N(CH_2)_3NH(CH_2)_4NH(CH_2)_3NH_2$, $H_2N(CH_2)_3NH(CH_2)_2NH(CH_2)_3NH_2$, $H_2N(CH_2)_2NH(CH_2)_3NH(CH_2)_2NH_2$, $H_2N(CH_2)_3NH(CH_2)_2NH_2$, $C_6H_5NH(CH_2)_2$ $NH(CH_2)_2NH_2$, and $N(CH_2CH_2NH_2)_3$, and polymeric polyamines such as linear or branched (including dendrimers) homopolymers and copolymers of ethyleneimine (i.e., aziridine). Many such compounds can be obtained, or are available, from general chemical suppliers such as, for example, Aldrich Chemical Company, Milwaukee, Wis. or Pfaltz and Bauer, Inc., Waterbury, Conn.

In some embodiments, benzoxazines derived from aliphatic polyamines, including poly(alkyleneoxy)polyamines, are preferred. As used herein, the phrase "derived from" refers to a structural limitation whereby the benzoxazine contains the residue of a polyamine, not a process limitation. It has been found that the polybenzoxazines derived from aliphatic polyamines are more flexible (as measured by dynamic mechanical analysis, DMA) than those polybenzoxazines derived from aromatic amines, such as aniline. Such aliphatic amine-derived benzoxazines may be copolymerized with aromatic amine derived benzoxazines to provide copolymeric polybenzoxazines.

The aliphatic polyamine may also be provided by a poly(alkyleneoxy)polyamine. The resultant polybenzoxazines contains the residue of a poly(alkyleneoxy) polyamines. Poly(alkyleneoxy)polyamines useful in making benzoxazines for subsequent polymerization can be selected from the following structures:
$H_2N-R^6-O-(R^7O)_p-(R^8O)_q-(R^7O)_r-R^6-NH_2$, i.e., poly(alkyleneoxy) diamines); or
$[H_2N-R^6O-(R^7O)_p-]_s-R^9$, wherein
$R^6$, $R^7$ and $R^8$ are alkylene groups having 1 to 10 carbon atoms and may be the same or may be different. Preferably, $R^6$ is an alkyl group having 2 to 4 carbon atoms such as ethyl, n-propyl, isopropyl, n-butyl or isobutyl. Preferably, $R^7$ and $R^8$ are alkyl groups having 2 or 3 carbon atoms such as ethyl, n-propyl or isopropyl. $R^9$ is the residue of a polyol used to prepare the poly(alkyleneoxy)polyamines (i.e., the organic structure that remains if the hydroxyl groups are removed). $R^9$ may be branched or linear, and substituted or unsubstituted (although substituents should not interfere with oxyalkylation reactions).

The value of p is ≥1, more preferably about 1 to 150, and most preferably about 1 to 20. Structures in which p is 2, 3 or 4 are useful too. The value of q and r are both ≥0. The value of s is >2, more preferably 3 or 4 (so as to provide, respectively, polyoxyalkylene triamines and tetraamines). It is preferred that the values of p, q, r and s be chosen such that the resulting complex is a liquid at room temperature as this simplifies handling and mixing thereof. Usually, the poly(alkyleneoxy)polyamines is itself a liquid. For the polyoxyalkylene, molecular weights of less than about 5,000 may be used, although molecular weights of about 1,000 or less are more preferred, and molecular weights of about 250 to 1,000 are most preferred.

Examples of particularly preferred poly(alkyleneoxy) polyamines include polyethyleneoxidediamine, polypropyleneoxidediamine, polypropyleneoxidetriamine, diethyleneglycolpropylenediamine, triethyleneglycolpropylenediamine, polytetramethyleneoxidediamine, polyethyleneoxide-co-polypropyleneoxidediamine, and polyethyleneoxide-co-polyproyleneoxidetriamine.

Examples of suitable commercially available poly(alkyleneoxy)polyamines include various JEFFAMINES from Huntsman Chemical Company such as the D, ED, and EDR series diamines (e.g., D-400, D-2000, D-5000, ED-600, ED-900, ED-2001, and EDR-148), and the T series triamines (e.g., T-403), as well as H221 from Union Carbide Company.

Many di- and polyamines, such as those just named, are available commercially, for example, those available from Huntsman Chemical, Houston, Tex. The most preferred di- or polyamines include aliphatic di- and triamines or aliphatic di- or polyamines and more specifically compounds with two or three primary amino groups, such as ethylene diamine, hexamethylene diamine, dodecanediamine, and the like. Useful commercial polydialkylsiloxanes having terminal or pendent amine groups include PDMS Diamine 5k, 10k or 15k from 3M Company or Tegomer™ A-Si 2120 or 2130 from Th. Goldschmidt; or DMS™-A11, A12, A15, A25 or A32, AMS™-132, 152, 162, and 232, ATM™-1112 from Gelest; or Rhodosil™ 21643 and 21644, 21642 and 21637 from Rhone-Poulenc.

Examples of useful aromatic amines include aniline, o-, m- or p-toluidine, 2,6-dimethyl aniline, 2,5-dimethyl aniline p-bromoaniline, 3,5-dimethyl aniline and 2,4-dimethyl aniline, p-nitroaniline, di-(4-aminophenyl)sulfone, di-(4-aminophenyl)ether, 2,2-bis(4-aminophenyl)propane, 4,4'-diamino diphenylmethane, 3,3'-dimethyl(4,4'-diaminodiphenyl methane, m- or p-phenylene diamine, m-xylylene diamine, toluene diamine, 4,4'methylene dianiline benzidine, 4,4'-thiodianiline, 4-methoxy-1,3-phenyl-diamine, 2,6-diaminopyridine, and dianisidine.

Other useful amines include amino acids such as glycine, alanine, and leucine and their methyl esters, aminoalcohols such as ethanolamine, 3-aminopropanol, and 4-aminobutanol, polyaminoethers containing ethylene glycol and diethylene glycol (such as Jeffamine™ diamines), and alkenyl amines such as allylamine and butenylamine.

Polymerizable compositions of the disclosure optionally include one or more co-curatives. Such co-curatives are selected from the group of a thiol compound, an amine compound, and a combination thereof. In certain embodiments, at least one of the thiol compound and the amine compound is polyfunctional. Such curatives can function as reactive diluents.

Useful co-curative compounds have at least one nucleophilic functional group that ring-opens the benzoxazine. Such compounds are of the generally formula:

wherein, in Formula (XII):
$R^{30}$ is a (hetero)hydrocarbyl group;
each Z is independently —S— or —NR$^{31}$, where R$^{31}$ is H or a hydrocarbyl group, including aryl and alkyl; and
p is 1 to 6 (in certain embodiments, p is at least 2).

As mentioned above, the polymerization of benzoxazine monomers to a polymer is believed to be an ionic ring opening polymerization which converts the oxazine ring to another structure, e.g., linear polymer or larger heterocyclic rings. It is thought that a chain transfer step(s) limits the molecular weight of the resulting polymer and causes some branching. The ring-opening reaction may be represented by the following Scheme I for reaction of a benzoxazine based on bisphenol A with a curative of formula $R^{30}$—(ZH)$_2$ to form a polymeric material:

Scheme I

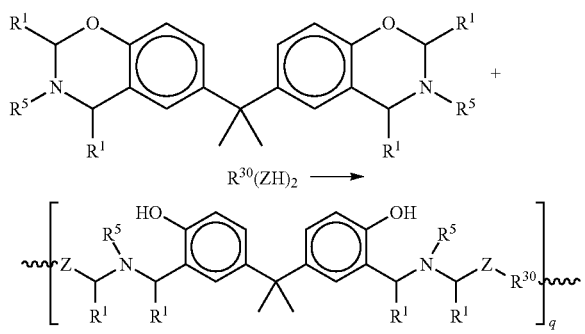

In Scheme I:
each R$^1$ is independently H or an alkyl group, and is the residue of an aliphatic aldehyde, Each R$^5$ is independently a (hetero)hydrocarbyl residue of a primary amino compound;
each R$^{30}$ is independently a (hetero)hydrocarbyl group;
Z is a —S— or —NR$^{31}$, wherein each R$^{31}$ is H or a hydrocarbyl group, including aryl and alkyl p is 1 to 6, or 2 to 6; and
q is the number of repeat units and is at least 1 (in certain embodiments, q is at least 2).

Although the curative illustrated in Scheme 1 only has two —ZH groups, other curatives can have more than two —ZH groups. Thus, after reacting with two benzoxazine groups, such curatives can have additional —ZH groups available for further reactions with additional benzoxazine groups. Further, in embodiments where the starting benzoxazine was prepared with a polyamine, R$^5$ groups may be connected to additional benzoxazine groups. Note further that as the composition comprises at least one polyfunctional thiol compound or amine compound, polymeric reaction products result.

In these embodiments there is an excess of benzoxazine, as an unreacted benzoxazine will homopolymerize in the presence of the catalyst to form a coextensive mixture or polymer network of benzoxazine adducts with the curative of Formula (XII) and poly(benzoxazines). In such embodiments, the molar amounts ratio of benzoxazine groups to the sum of amine and/or thiol "Z" groups from the compound $R^{30}$—(ZH)$_p$, is 3:1 to 100:1, or in certain embodiments 4:1 to 50:1.

With reference to the curative of Formula (XII), $R^{30}$ (ZH)$_p$, the benzoxazine ring may be ring-opened by an amine compound. Useful amine compounds correspond to primary and secondary amines of the formula:

wherein, in Formula (XIII), $R^{30}$, $R^{31}$, and p are as defined above for Formula (XII). Such compounds include primary and secondary (hetero)hydrocarbyl monoamines and polyamines. In the compounds of Formula (VIII), the R$^{30}$ may be (hetero)hydrocarbyl group that has a valence of p, and is the residue of a mono-, di- or higher amine having at least one primary amine group. The R$^{30}$ can be an alkyl, a cycloalkyl or aryl, and p is 1 to 4, or 2 to 4. In certain embodiments, the R$^{30}$ is selected from mono- and polyvalent (hetero)hydrocarbyl (i.e., alkyl and aryl compounds having 1 to 30 carbon atoms, or alternatively (hetero)hydrocarbyl including heteroalkyl and heteroaryl having 1 to twenty heteroatoms of oxygen). Each R$^{31}$ is independently H or a hydrocarbyl group, including aryl and alkyl, and p is 1 to 6, or 2 to 6. It will be clear to one skilled in the art that the same amines used in the preparation of the benzoxazines will also be useful in the ring-opening reaction.

The benzoxazine ring may also be opened with thiols of the formula:

wherein, in Formula (XIV), $R^{30}$ and p are as defined above for Formula (XII). That is, in the compounds of Formula (XIV), p is 1 to 6, or 2 to 6, and R$^{30}$ includes a (hetero)hydrocarbyl group, including aliphatic and aromatic monothiols and polythiols. R$^{30}$ may optionally further include one or more functional groups including hydroxyl, acid, ester, cyano, urea, urethane and ether groups.

In some preferred embodiments, the thiol compounds of Formula (XIV) are of the formula:

wherein in Formula (XV):
$R^{32}$ is an alkylene group, an aryl group, an oxyalkylene group, or combination thereof; $R^{33}$ is a divalent hydrocarbyl group;
x is 0 or 1; and
y is 1 to 6, preferably 2 to 6.

In certain embodiments, the compounds of Formulas (XV) to are those in which $R^{32}$ is an alkylene group.

Useful alkyl thiols include methyl, ethyl and butyl thiol. Other useful thiols include 2-mercaptoethanol, 3-mercapto-1,2-propanediol, 4-mercaptobutanol, mercaptoundecanol, 2-mercaptoethylamine, 2,3-dimercaptopropanol, 3-mercaptopropyltrimethoxysilane, mercaptoalkanoic acids and esters thereof including mercaptoproionic acid, 2-chloroethanethiol, 2-amino-3-mercaptopropionic acid, dodecyl mercaptan, thiophenol, 2-mercaptoethyl ether, and pentaerythritol tetrathioglycolate. Specific examples of useful polythiols include dimercaptodiethyl sulfide; 1,6-hexanedithiol; 1,8-dimercapto-3,6-dithiaoctane; propane-1,2,3-trithiol; 1,2-bis[(2-mercaptoethyl)thio]-3-mercaptopropane; tetrakis(7-mercapto-2,5-dithiaheptyl)methane; and trithiocyanuric acid.

Another useful class of polythiols includes those obtained by esterification of a polyol with a terminally thiol-substituted carboxylic acid (or derivative thereof such as esters or acyl halides) including α- or β-mercaptocarboxylic acids such as thioglycolic acid or 3-mercaptopropionic acid or esters thereof. Useful examples of compounds thus obtained include ethylene glycol bis(thioglycolate), pentaerythritol tetrakis(3-mercaptopropionate), ethylene glycol bis(3-mercaptopropionate), trimethylolpropane tris(thioglycolate), trimethylolpropane tris(3-mercaptopropionate), pentaerythritol tetrakis(thioglycolate) pentaerythritol tetrakis(3-mercaptopropionate), all of which are commercially available. A specific example of a polymeric polythiol is polypropylene ether glycol bis(3-mercaptopropionate) which is prepared from polypropylene-ether glycol (e.g., that available under the trade name PLURAXOL P201 from BASF Wyandotte Chemical Corp.) and 3-mercaptopropionic acid by esterification.

In some embodiments, useful thiols include those thiols derived from epoxy compounds. The polythiol may be derived from the reaction between $H_2S$ (or equivalent) and an epoxy resin having two or more functional groups and preferably having a molecular weight of less than 1000. For example, bifunctional epoxy resins, such as a bisphenol A epoxy resin and a bisphenol F epoxy resin, and novolak epoxy resins, such as a phenolic novolak epoxy resin and a cresol novolak epoxy resin, or amine epoxy resins, can be used. In addition, generally known polyfunctional epoxy resins, heterocycle-containing epoxy resins, and alicyclic epoxy resins can be used. These epoxy resins may be used alone or in combinations of two or more chemical types or molecular weight ranges.

A particularly useful polythiol is that derived from bisphenol-A diglycidyl ether, available as QX-11 from Japan Epoxy Resins, having a thiol equivalent weight of approximately 245 and the following general structure, where n is at least 1:

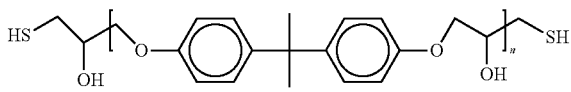

Useful soluble, high molecular weight thiols include polyethylene glycol di(2-mercaptoacetate), and those resins available under the trade names LP-3 (supplied by LP North America, Houston, Tex.) and PERMAPOL P3 (supplied by Products Research & Chemical Corp., Glendale, Calif.), and compounds such as the adduct of 2-mercaptoethylamine and caprolactam.

The compounds of Scheme I may be prepared by combining the benzoxazine compounds with a curative either neat or in a suitable solvent. Suitable solvents include those in which the reactants dissolve, preferably at room temperature, and that are nonreactive with the various components in the polymerizable composition. Examples of suitable solvents include butyl acetate, toluene, xylene, tetrahydrofuran, ethylene glycol dimethyl ether and the like. Heating is generally unnecessary as the thiol and amine-induced ring opening is exothermic.

Combinations of various curatives can be used if desired. If used, a curative is present in an amount of at least 5%, and often as much as 60% of the benzoxazine equivalent.

Polymerizable compositions of the present disclosure may include a film-forming material, which can be in the form of monomers, oligomers, polymerizable pre-polymers, polymers, or a combination thereof. These materials, as the name suggests, enable the formation of benzoxazine-containing films that reduce the brittleness of typical benzoxazines. Such films are typically flexible and tacky over a desired temperature window in the sub-ambient to benzoxazine-cure temperature range. The film-former may be reactive or nonreactive with the benzoxazine, or any other components such as the catalyst, co-catalyst, curative, toughener, and the like.

In some embodiments the film-formers are materials, particularly oligomers or polymers, which form a homogenous mixture with the benzoxazine/catalyst mixtures at processing temperatures, preferably from sub-ambient to the processing of the polymerizable benzoxazine composition. Catalyst present in these films provides for excellent shelf life even when the films are stored at elevated temperatures.

Optionally, film formers can have reactive functional groups that react with a portion of the benzoxazine. The film-forming material may include a reactive film-forming material that includes one or more functional groups reactive with the benzoxazine, such as those selected from the group of a thiol, an amine, a benzoxazine, a formaldehyde, an aldehyde, and a combination thereof. The reactive film-forming material may include a compound that can react with, and be bonded to, the benzoxazine. The presence of one or more functional groups can afford increased processability options for said films: they can be processed above or below the reaction temperature of the reactive group to afford variable degree of tack, flexibility, and other desirable properties. Examples of such reactive film formers include, but are not limited to, amine-terminated butadiene-nitrile (ATBN), hydroxy-terminated butadiene-nitrile (HOTBN), carboxy-terminated butadiene-nitrile CTBN, amine-terminated poly(alkylene oxides) (such as those available under the trade names JEFFAMINE and VERSALINK) and related compounds.

In some embodiment the reactive film-formers may have different reactive groups in the backbone and termini. Examples of such materials include the end-functional butadiene-nitrile rubbers such as ATBN, which has unsaturation in its repeat unit and amine functional reactive groups on its ends. The amine functional groups may react with the benzoxazine by nucleophilic ring-opening (e.g., as described herein with respect to the curatives), and the unsaturation may react with the catalyst by vulcanization.

Examples of suitable nonreactive film-forming polymers for coating formulations include acrylic polymers (e.g., poly(methyl methacrylate-co-ethyl acrylate) and poly(m-ethyl acrylate-co-acrylic acid)); polyurethanes (e.g., reaction products of aliphatic, cycloaliphatic or aromatic diisocyanates with polyester glycols or polyether glycols); polyolefins; polystyrene; copolymers of styrene with acrylate(s) (e.g., poly(styrene-co-butyl acrylate); polyesters, (e.g., polyethylene terephthalate, polyethylene terephthalate isophthalate, and polycaprolactone); polyamides, (e.g., polyhexamethylene adipamide); vinyl polymers, (e.g., poly(vinyl acetate/methyl acrylate) and poly(vinylidene chloride/vinyl acetate); polydienes, (e.g., poly(butadiene/styrene)); cellulosic polymer including cellulose ethers and cellulose esters, (e.g., ethyl cellulose and cellulose acetate/butyrate); polyimides; polysulfones; urethane-acrylate copolymers; and polyethers. Such polymers are available, for example, from commercial sources or may be prepared using methods and starting materials known in the art.

Combinations of various film-forming materials may be used if desired.

If used, film-forming material is present in an amount of at least 10 wt-%, and in certain embodiments, at least 25 wt-%, based on the total weight of the polymerizable composition. If used, film-forming material is present in an amount of no greater than 75 wt-%, and in certain embodiments, no greater than 50 wt-%, based on the total weight of the polymerizable composition.

Certain other optional additives may also be included, including, for example, tougheners, epoxy resin, and other reactive diluents. Such additives provide various functions (e.g., film formation). For example, a toughening agent may reduce brittleness and/or add strength to the composition after curing without interfering with curing. An epoxy resin may reduce the viscosity, lower Tg, and/or function as a carrier for a toughening agent.

It will be understood by one of skill in the art that one compound may form two or more different functions. For example, a compound may function as both a toughening agent and a curative.

In some embodiments, such additives will not react with the benzoxazine. In some embodiments, such additives may include reactive functional groups, particularly as end groups.

Examples of such reactive functional groups include, but are not limited to, amines, thiols, alcohols, epoxides, vinyls, and combinations thereof. Toughening agents are useful in polymerizable compositions of the present disclosure are polymeric compounds having both a rubbery phase and a thermoplastic phase such as: graft polymers having a polymerized, diene, rubbery core and a polyacrylate, polymethacrylate shell; graft polymers having a rubbery, polyacrylate core with a polyacrylate or polymethacrylate shell; and elastomeric particles polymerized in situ in the epoxide from free radical polymerizable monomers and a copolymerizable polymeric stabilizer.

Examples of useful toughening agents of the first type include graft copolymers having a polymerized, diene, rubbery backbone or core to which is grafted a shell of an acrylic acid ester or methacrylic acid ester, monovinyl aromatic hydrocarbon, or a mixture thereof, such as disclosed in U.S. Pat. No. 3,496,250 (Czerwinski). Exemplary rubbery backbones include polymerized butadiene or a polymerized mixture of butadiene and styrene. Exemplary shells including polymerized methacrylic acid esters are lower alkyl ($C_1$-$C_4$) substituted methacrylates. Exemplary monovinyl aromatic hydrocarbons are styrene, alpha-methylstyrene, vinyltoluene, vinylxylene, ethylvinylbenzene, isopropylstyrene, chlorostyrene, dichlorostyrene, and ethylchlorostyrene. It is important that the graft copolymer contain no functional groups that would poison the catalyst.

Examples of useful toughening agents of the second type are acrylate core-shell graft copolymers wherein the core or backbone is a polyacrylate polymer having a glass transition temperature below 0° C., such as polybutyl acrylate or polyisooctyl acrylate to which is grafted a polymethacrylate polymer (shell) having a glass transition above 25° C., such as polymethylmethacrylate.

The third class of toughening agents useful in the invention includes elastomeric particles that have a glass transition temperature ($T_g$) below 25° C. before mixing with the other components of the composition. These elastomeric particles are polymerized from free radical polymerizable monomers and a copolymerizable polymeric stabilizer that is soluble in the benzoxazine. The free radical polymerizable monomers are ethylenically unsaturated monomers or diisocyanates combined with co-reactive difunctional hydrogen compounds such as diols, diamines, and alkanolamines.

Useful toughening agents include core/shell polymers, such as methacrylate-butadiene-styrene (MBS) copolymer wherein the core is crosslinked styrene/butadiene rubber and the shell is polymethylacrylate (for example, those available under the trade names ACRYLOID KM653 and KM680, from Rohm and Haas, Philadelphia, Pa.), those having a core including polybutadiene and a shell including poly(methyl methacrylate) (for example, those available under the trade names KANE ACE M511, M521, B11A, B22, B31, and M901 from Kaneka Corporation, Houston, Tex. and CLEARSTRENGTH C223 from ATOFINA, Philadelphia, Pa.), those having a polysiloxane core and a polyacrylate shell (for example, those available under the trade names CLEARSTRENGTH S-2001 from ATOFINA and GENIOPERL P22 from Wacker-Chemie GmbH, Wacker Silicones, Munich, Germany), those having a polyacrylate core and a poly(methyl methacrylate) shell (for example, those available under the trade names PARALOID EXL2330 from Rohm and Haas and STAPHYLOID AC3355 and AC3395 from Takeda Chemical Company, Osaka, Japan), those having an MBS core and a poly(methyl methacrylate) shell (for example, those available under the trade names PARALOID EXL2691A, EXL2691, and EXL2655 from Rohm and Haas); and the like; and mixtures thereof.

As used above, for acrylic core/shell materials "core" will be understood to be an acrylic polymer having a $T_g$ of less than 0° C. and "shell" will be understood to be an acrylic polymer having a $T_g$ of greater than 25° C.

Other useful toughening agents include: carboxylated and amine terminated acrylonitrile/butadiene vulcanizable elastomer precursors, such as those available under the trade names HYCAR CTBN 1300X8, ATBN 1300X16, and HYCAR 1072 from B. F. Goodrich Chemical Co.; butadiene polymers, such as those available under the trade name HYCAR CTB; amine functional polyethers such as HCl 101 (i.e., polytetramethylene oxide diamine) a 10,000 MW, primary amine-terminated, compound from 3M Co., St. Paul, Minn., and those available under the trade name JEFFAMINE from Huntsman Chemical Co., Houston, Tex.; functional acrylic rubbers including acrylic core/shell materials, such as those available under the trade names ACRYLOID KM330 and 334 from Rohm & Haas; and core/shell polymers, such as methacrylate-butadiene-styrene (MBS) copolymer wherein the core is crosslinked styrene/butadiene rubber and the shell is polymethylacrylate (e.g., that available under the trade names ACRYLOID KM653 and KM680; Rohm and Haas). Useful liquid poly-butadiene hydroxyl terminated resins include those available under the trade names LIQUIFLEX H by Petroflex of Wilmington, Del., and HT 45 by Sartomer of Exton, PN.

Tougheners may include epoxy-terminated compounds, which can be incorporated into the polymer backbone. A typical, preferred, list of tougheners includes: acrylic core/shell polymers; styrene-butadiene/methacrylate core/shell polymers; polyether polymers; carboxylated acrylonitrile/butadienes; and carboxylated butadienes. Advantages can be obtained from the provision of the chain extension agent in a composition with an epoxy resin even in the absence of a toughening agent as described above. However, particular advantage is achieved from the presence of the toughening agent or combinations of different agents, as previously suggested.

It will be appreciated that some of the described natural and synthetic rubbers will have unsaturation in the chain that can be crosslinked by the catalyst. Thus, the catalyst will polymerize the benzoxazine, and concurrently vulcanize the rubber to for a coextensive network of poly(benzoxazine) and vulcanized rubber.

Various combinations of toughening agents can be used if desired.

If used, a toughening agent is present in a polymerizable composition in an amount of at least 3 wt-%, or at least 5 wt-%, based on the weight of the benzoxazine. If used, a toughening agent is present in a polymerizable composition in an amount of no greater than 35 wt-%, or no greater than 25 wt-%, based on the weight of the benzoxazine.

Other optional additives include epoxy resins. Such materials may function as a curative, a reactive diluent, or a co-reactant. The epoxy group does not react directly with the benzoxazine as do the amines or thiols of the curatives, but the phenolic group resulting from the ring opening of the benzoxazine may further react to ring-open the epoxy groups.

Polyepoxy compounds which can be utilized in the compositions of the disclosure include both aliphatic and aromatic polyepoxides. In certain embodiments, glycidyl aliphatic epoxides are preferred. The aromatic polyepoxides are compounds containing at least one aromatic ring structure, e.g., a benzene ring, and more than one epoxy group. Preferred aromatic polyepoxides include the polyglycidyl ethers of polyhydric phenols (e.g., bisphenol A derivative resins, epoxy cresol-novolac resins, bisphenol F derivative resins, epoxy phenol-novolac resins) and the glycidyl esters of aromatic carboxylic acids. The most preferred aromatic polyepoxides are the polyglycidyl ethers of polyhydric phenols.

Representative examples of aliphatic polyepoxides which can be utilized in the composition of the disclosure include 3',4'-epoxycyclohexylmethyl-3,4-epoxycyclohexanecarboxylate, 3,4-epoxycyclohexyloxirane, bis(3,4-epoxycyclohexylmethyl)adipate, the diglycidyl ester of linoleic dimer acid, 1,4-bis(2,3-epoxypropoxy)butane, 4-(1,2-epoxyethyl)-1,2-epoxycyclohexane, 2,2-bis(3,4-epoxycyclohexyl)propane, polyglycidyl ethers of aliphatic polyols such as glycerol or hydrogenated 4,4'-dihydroxydiphenyl-dimethylmethane, and mixtures thereof. Preferred such polyepoxides do not include cycloaliphatic groups.

Representative examples of aromatic polyepoxides, which can be utilized in the composition of the disclosure, include glycidyl esters of aromatic carboxylic acids, e.g., phthalic acid diglycidyl ester, isophthalic acid diglycidyl ester, trimellitic acid triglycidyl ester, and pyromellitic acid tetraglycidyl ester, and mixtures thereof; N-glycidylaminobenzenes, e.g., N,N-diglycidylbenzeneamine, bis(N,N-diglycidyl-4-aminophenyl)methane, 1,3-bis(N,N-diglycidylamino)benzene, and N,N-diglycidyl-4-glycidyloxybenzeneamine, and mixtures thereof; and the polyglycidyl derivatives of polyhydric phenols, e.g., 2,2-bis-(4-(2,3-epoxypropoxy)phenylpropane, the polyglycidyl ethers of polyhydric phenols such as tetrakis(4-hydroxyphenyl)ethane, pyrocatechol, resorcinol, hydroquinone, 4,4'-dihydroxydiphenyl methane, 4,4'-dihydroxydiphenyl dimethyl methane, 4,4'-dihydroxy-3,3'-dimethyldiphenyl methane, 4,4'-dihydroxydiphenyl methyl methane, 4,4'-dihydroxydiphenyl cyclohexane, 4,4'-dihydroxy-3,31-dimethyldiphenyl propane, 4,4'-dihydroxydiphenyl sulfone, and tris-(4-hydroxyphenyl)methane, polyglycidyl ethers of novolacs (reaction products of monohydric or polyhydric phenols with aldehydes in the presence of acid catalysts), and the derivatives described in U.S. Pat. No. 3,018,262 (Schroeder) and U.S. Pat. No. 3,298,998 (McConnell et al.), as well as the derivatives described in the Handbook of Epoxy Resins by Lee and Neville, McGraw-Hill Book Co., New York (1967), and mixtures thereof.

An exemplary class of polyepoxy compounds is polyglycidyl ethers of polyhydric alcohol, particularly polyphenols. The glycidyl epoxy compounds are generally more reactive toward amines than cycloaliphatic epoxy compounds. In some embodiments, the epoxy compound generally has an epoxy equivalent weight (EW) of 170 to 4,000, or 170 to 1,000. The epoxide equivalent weight (EW) is defined as the weight in grams of the epoxy functional compound that contains one gram equivalent of epoxy (oxirane) functional groups.

If used, an epoxy resin is present in a polymerizable composition in an amount of at least 5 wt-%, or at least 3 wt-%, based on the weight of the benzoxazine. If used, a toughening agent is useful in a polymerizable composition in an amount of no greater than 35-wt-%, or no greater than 25 wt-%, based on the weight of the benzoxazine.

Other optional additives, or adjuvants, may be added to the compositions as desired. Examples of such other optional additives include as colorants, abrasive granules, anti-oxidant stabilizers, thermal degradation stabilizers, light stabilizers, conductive particles, tackifiers, flow agents, bodying agents, flatting agents, inert fillers, binders, blowing agents, fungicides, bactericides, surfactants, plasticizers, rubber tougheners, and other additives known to those skilled in the art. Such additives are typically substantially unreactive, such as fillers, both inorganic and organic. These adjuvants, if present, or other optional additives, are added in an amount effective for their intended purpose.

The choice and amounts of optional components depend on the needs of the specific application. For example, for a structural/semi-structural benzoxazine adhesive, the polymerizable composition could contain silica fillers, glass bubbles, and tougheners. These adjuvants add toughness to and reduce the density of the polymerized composition. For a protective coating, such as an abrasion resistant coating, which is generally hard, requires a significant portion of the formulation to be a hard resin that includes generally short chain lengths and high functionality. Coatings undergoing some flex require toughness which can be obtained by using the above-mentioned additive to increase toughness and increase flexibility. Clear coatings require the cured resins to have little to no phase separation. This is obtained by controlling the compatibility of the resins or controlling phase separation by cure rate.

Reaction conditions for curing the composition depend on the reactants and amounts used and can be determined by those skilled in the art. The curable compositions are made by mixing in any order the benzoxazine compound and the ammonium catalyst described above. Generally, the composition is then heated to a temperature between about 50 and 200° C., preferably between about 130-180° C., for a time of about 1-120 minutes.

Suitable sources of heat to cure the compositions of the invention include induction heating coils, ovens, hot plates, heat guns, infrared sources including lasers, microwave sources. Suitable sources of light and radiation include ultraviolet light sources, visible light sources, and electron beam sources.

Solvents can be used to assist in dissolution of the ammonium catalyst in the benzoxazine monomers, and also as a processing aid. It may be advantageous to prepare a concentrated solution of the ammonium catalyst in a small amount of solvent to simplify the preparation of the polymerizable composition. Useful solvents are lactones, such as gamma-butyrolactone, gamma-valerolactone; and epsilon-caprolactone; ketones such as acetone, methyl ethyl ketone, methyl isobutyl ketone, cyclopentanone and cyclohexanone; sulfones, such as tetramethylene sulfone, 3-methylsulfolane, 2,4-dimethylsulfolane, butadiene sulfone, methyl sulfone, ethyl sulfone, propyl sulfone, butyl sulfone, methyl vinyl sulfone, 2-(methylsulfonyl)ethanol, 2,2'-sulfonyldiethanol; sulfoxides, such as dimethyl sulfoxide; cyclic carbonates such as propylene carbonate, ethylene carbonate and vinylene carbonate; carboxylic acid esters such as ethyl acetate, methyl cellosolve acetate, methyl formate; and other solvents such as methylene chloride, nitromethane, acetonitrile, glycol sulfite and 1,2-dimethoxyethane (glyme).

Compositions of this invention are useful for coatings, foams, shaped articles, adhesives (including structural and semistructural adhesives), magnetic media, filled or reinforced composites, coated abrasives, caulking and sealing compounds, casting and molding compounds, potting and encapsulating compounds, impregnating and coating compounds, conductive adhesives for electronics, protective coatings for electronics, and other applications that are known to those skilled in the art. When uncured or partially cured, the benzoxazine compositions exhibit pressure-sensitive adhesive properties, including tack. In some embodiments, the present disclosure provides a coated article comprising a substrate, having a cured coating of the benzoxazine thereon.

To prepare a structural/semi-structural benzoxazine adhesive, the curable composition could contain additional adjuvants such as silica fillers, glass bubbles and tougheners. These adjuvants add toughness to and reduce the density of the cured composition. Useful fillers may include additional optional materials such as reinforcement-grade (reinforcing) filler materials, pigments, antioxidants, stabilizing agents, processing aids, neutralizers, rheology modifiers, silane coupling agents, flow control agents, lubricants, flame retardants, flame retardant synergists, antimicrobials, any other additive known in the art, and any combination of these in any proportion. The concentration of these additional materials in the curable composition of the present invention may be any concentration sufficient to provide a desired result.

Reinforcement-grade (reinforcing) filler material may optionally be included in the curable composition to enhance the physical properties of cured composition at elevated temperatures. Examples of suitable filler materials include silica-based reinforcement filler, reinforcement-grade carbon black, fluoroplastics, clays, and any combination of any of these in any proportions.

Examples of suitable silica-based reinforcement fillers include silica (also referred to as silicon dioxide); silane-treated silica; fumed silica (e.g., such as the CABOSIL™ M-5 product commercially from Cabot Corporation of Billerica, Mass.); silane-treated fumed silica such as, for example, the AEROSIL™R972 product, the AEROSIL™R974 product, and the AEROSIL™200 product that are all commercially available from Degussa Company of Parsippany, N.J. and the CABOSIL™ line of silane-treated fumed silica products commercially from Cabot Corporation of Billerica, Mass.; silicates; and any combination of any of these in any proportion.

Examples of suitable silicates include calcium silicate (wollastonite), aluminum silicate, and mixtures of these. In some embodiments, the average particle size of the silica-based reinforcement filler may be less than about 100 nanometers (nm). Glasses may be used, including fiberglass filament and mats. In other embodiments, the average particle size of the silica-based reinforcement filler may be as low as about 10 nm and as high as about 20 nm.

The phrase "reinforcement-grade carbon black" as used herein, includes any carbon black with an average particle size smaller than about 40 nm, which corresponds to an average surface area of about 65 $m^2/g$. Some particularly suitable average particle sizes for reinforcement-grade carbon black range from about 9 nm to about 40 nm. Carbon black that is not reinforcement grade include carbon black with an average particle size larger than about 40 nm. Carbon fibers and carbon nanotubes are also contemplated as useful fillers.

To prepare protective coatings, the choice of materials depends on the needs of the specific application. Abrasion resistant coatings are generally hard and require a significant portion of the formulation to be a hard resin, which are generally short chain length and have high functionality. Coatings undergoing some flex require toughness which can be obtained by lowering the crosslink density of the cure formulation. Clear coatings require the cured resins to have little to no phase separation. This is obtained by controlling the compatibility of the resins or controlling phase separation by cure rate. Adjuvants could be added to these coating formulations in an amount effective for their intended use.

The composition may be coated onto substrates at useful thicknesses ranging from 25-500 micrometers or more. Coating can be accomplished by any conventional means such as roller, dip, knife, or extrusion coating. Solutions of the curable composition may be used to facilitate coating. Stable thicknesses are necessary to maintain the desired coating thickness prior to crosslinking of the composition to form the crosslinked composition.

Useful substrates can be of any nature and composition, and can be inorganic or organic. Representative examples of useful substrates include ceramics, siliceous substrates including glass, metal, natural and man-made stone, woven and nonwoven articles, polymeric materials, including thermoplastic and thermosets, (such as polymethyl (meth)acrylate), polycarbonate, polystyrene, styrene copolymers, such as styrene acrylonitrile copolymers, polyesters, polyethylene terephthalate), silicones, paints (such as those based on acrylic resins), powder coatings (such as polyurethane or hybrid powder coatings), and wood and composites of the foregoing materials.

The instant disclosure further provides a pressure-sensitive adhesive which comprises a coating of the uncured or partially cured benzoxazine composition on a suitable substrate, such as an adhesive tape backing. A preferred method of preparing a pressure-sensitive adhesive article comprises partially curing the novel composition to a useful coating viscosity, coating the partially crosslinked composition onto a substrate (such as a tape backing) and further curing the composition. Useful coating viscosities are generally in the range of 500 to 10,000 cps.

The curable benzoxazine compositions may also be useful in the preparation of reinforced composite articles, such as prepregs for use in high performance applications such as manufacture of aircraft components. Fiber reinforced composites provide structural efficiency at lower densities compared to metallic structures, allowing for the manufacture of light weight, high strength components. Fiber reinforced composites may be prepared using a variety of techniques, for example, hand or automated layup of prepreg, filament winding, compression molding and resin transfer molding. Of these techniques, hand or automated layup of prepreg is most common.

The present invention also provides a prepreg comprising a fiber reinforcement impregnated with the curable bezxoxazine composition described above. The prepreg comprises a fiber reinforcement impregnated with an uncured or partially cured curable benzoxazine resin matrix. Prepregs are available in a variety of forms depending on the configuration of the fiber reinforcement. For example, when the fiber reinforcement comprises a fiber bundle (or tow), the prepreg is specifically referred to as a "towpreg". By way of another example, when the fiber reinforcement comprises a collimated series of fiber bundles, the prepreg is specifically referred to as "prepreg tape".

Prepregs are typically supplied to part fabricators who convert the material into cured composite components using heat and pressure to cure the resin. For example, when the prepreg is in the form of a tape, the part fabricator cuts lengths of the tape and places them on a tool surface in the desired ply orientation. This operation can be done manually or automatically and is generally referred to as "layup". When the tool has a complex or curved or vertical configuration, the prepreg preferably has good tack to hold the plies together and to the tool until layup is complete. The prepreg also preferably has good drape or conformability, allowing it to conform to the tool shape. Preferably, the prepreg cures uniformly to provide composite parts having high glass transition temperatures.

This allows the cured composite to withstand a variety of stresses (such as elevated temperatures, mechanical stresses, exposure to solvents, etc.) without loss of structural integrity.

The present disclosure also provides a method of making a prepreg comprising the steps of providing the curable benzoxazine composition; providing a fiber reinforcement; and impregnating the fiber reinforcement with the resin matrix. The present invention further provides cured composites prepared from prepregs of the invention. The cured composites can be used as structural and non-structural aircraft components, space structures, pressure vessels, tanks, pipes, composites for electronics such as circuit boards, and automotive body and engine parts, and the like.

The purpose of the fiber reinforcement is to provide strength to the cured composite. The fibers of the fiber reinforcement can comprise a variety of different materials including glass fibers, carbon fibers, polyamide fibers such as poly(p-phenylene terephthalamide) fibers (for example, Kevlar' fiber available from E.I. duPont de Nernours and Co., Inc., Wilmingtom, Del.) and ceramic fibers. Carbon fibers are typically used as the reinforcing fiber in advanced aerospace structural composites.

The fiber reinforcement may comprise a variety of configurations. For example, the fiber reinforcement may comprise a woven structure constructed by interlacing yarns, fibers or filaments to form patterns such as plain, harness satin or leno weaves. Alternatively, the fiber reinforcement may comprise a nonwoven structure or planar textile structure produced by loosely compressing together fibers, yarns, and the like. The fiber reinforcement may also comprise a tow (i.e., an untwisted bundle of continuous fibers) or a roving (i.e., a number of yarns, strands, tows or ends collected into a parallel bundle with little or no twist).

The fibers of the reinforcement may be unsized or coated with sizing. Preferably, the fibers are unsized. When a sizing is used, however, it preferably does not materially affect the performance of the ultimate prepreg or cured composite, for example, by causing a substantial reduction in $T_g$.

The curable benzoxazine composition can be used to impregnate a variety of fiber reinforcements such as tows (i.e., bundles of fibers), or woven structures. Impregnation may be accomplished, for example, by heating the benzoxazine composition to temperatures at which it will flow and depositing it onto the fiber reinforcement. It is also possible to provide, for example, a bath of flowing benzoxazine composition and immerse the fiber reinforcement (such as tow) in the bath. Impregnation of the fiber reinforcement may also be accomplished by forming a film of the benzoxazine composition on a release liner and subsequently transfer laminating the film to a fiber reinforcement using pressure and/or heat. Preferably, for this lamination process, the curable benzoxazine composition has a viscosity in the range of from 10 to 30 poise at temperatures less than 150° C. for ease of processing and to provide sufficient wet out of the fibers of the reinforcement without initiating resin cure. Alternatively, the fiber reinforcement may be placed on a tool and then impregnated with the resin composition by application of heat, pressure, and vacuum, or any combinations thereof. Methods for preparing prepregs employ solvent-free processing for environmental reasons and to preclude the presence of residual volatiles which can cause porosity during cure, possibly resulting in reduced performance The prepreg is then cured using heat and pressure such as provided by autoclave or press curing. Benzoxazine compositions of the invention may be used to provide cured composites using a variety of processes such as pultrusion, filament winding, automated fiber placement, resin transfer molding, continuous resin transfer molding, resin film infusion, automated tow placement, automated and manual tape lay-up, vacuum bag lamination, press lamination, roll lamination, and the like.

Cured composites of the invention advantageously exhibit little to no resin migration and glass transition temperatures ($T_g$) that are comparable to the corresponding neat resins. These characteristics enable the cured composite to withstand a variety of stresses (such as elevated temperatures, mechanical stresses, exposure to solvents, etc.) without loss of structural integrity.

EXAMPLES

Except where specified to the contrary, amounts are given in equivalents (eq). Equivalents are based on the moles of reactive groups per mole of reactant molecule. Hence, 2 equivalents of a bifunctional reactant represents one mole of that reactant, and one mole of a trifunctional reactant would represent 3 eq of that reactant. Catalysts are treated as if monofunctional.

List of Abbreviations Employed:

BZ-1 Phenol-aniline benzoxazine from Huntsman Advanced Materials

BZ-2 A benzoxazine derived from para-cresol, aniline and paraformaldehyde, prepared by the method of Ishida, U.S. Pat. No. 5,543,516.

BZ-3 Araldite MT35700 from Huntsman Advanced Materials

CAT-1 Iodine, CAS #: 7553-56-2, available from Sigma Aldrich, Milwaukee, Wis.

CAT-2 1',1'''-dimethyl-1,1''-biferrocenium triiodide, CAS #: 113575-26-1, prepared as described in Preparative Example 1.

CAT-3 Tetrabutylammonium triiodide, CAS #: 13311-45-0, available from Sigma Aldrich, Milwaukee, Wis.

CAT-4 Ferrocenium Triiodide, CAS #: 1291-35-6, prepared as described in Preparative Example 2.

CAT-5 Bromine, CAS #: 7726-95-6, Available from Sigma Aldrich, Milwaukee, Wis.

CAT-6 Tetrabutylammonium tribromide; CAS #: 38932-80-8; Available from Sigma Aldrich, Milwaukee, Wis.

CAT-7 1-Benzyl-3-methylimidazolium diiodochlorate, prepared as described in Preparative Example 4.

CAT-8 1-Benzyl-3-methylimidazolium hexaiodochlorate, prepared as described in Preparative Example 5.

CCAT-1 Tetrabutylammonium iodide; CAS #: 311-28-4; available from Sigma Aldrich, Milwaukee, Wis.

CCAT-2 Tetrabutylammonium bromide; CAS #: 1643-19-2; available from Sigma Aldrich, Milwaukee, Wis.

Test Methods

Method of Measuring Cure Reaction Exotherm Via Differential Scanning Calorimeter (DSC)

A TA Instruments Q Series DSC (obtained from TA Instruments, New Castle, Del.) equipped with an autosampler was used. Approximately 5 mg of resin were weighed into an aluminum DSC pan. The sample pan was loaded into the DSC instrument, and the heat flow of the sample relative to an empty reference pan was measured in a dynamic DSC measurement with a thermal ramp rate of 10° C./min from 20° C. to 325° C.

Method of Measuring the Glass Transition Temperature (Tan δ Peak) Via Dynamic Mechanical Analyzer (DMA)

A TA Instruments RSA-G2 solids analyzer (obtained from TA Instruments, New Castle, Del.) equipped with a three-point bending fixture was used. The in-phase and out-of-phase deformation response was measured while applying a sinusoidal strain of 0.05% at a frequency of 1 Hz. The resulting storage and loss moduli and loss tangent were calculated. The temperature was ramped at 2° C./min over a temperature range spanning the glass to rubber transition, 25° C. to 200° C.

Preparative Example 1

Ferrocenium triiodide (CAT-4) salts were synthesized following a literature method by adding a stoichiometric amount of iodine to the neutral ferrocene in a suitable solvent. For example, ferrocenium triiodide was synthesized by adding (dropwise) 3.807 g of iodine dissolved in about 50 mL of absolute ethanol to a stirred solution (about 50 mL) of 1.860 g (0.01 moles) of ferrocene also in absolute ethanol. The solution were warmed slightly (perhaps 40° C.) prior to addition to facilitate dissolution of the iodine and ferrocene. The mixture was stirred overnight at room temperature and the dark blue/black microcrystals that precipitated out of the ethanol were collected by filtration, washed with additional absolute ethanol, and dried under a stream of nitrogen gas.

Preparative Example 2

1',1'''-dimethyl-1,1''-biferrocenium triiodide (CAT-2) salts was synthesized similarly to the Preparative Example 1, except benzene was employed as the solvent instead of the absolute ethanol.

Preparative Example 3

Benzyl Iodide (CAT-9) was prepared as follows: A 20 mL amber vial with a magnetic stir bar was charged with benzyl chloride (1.26 g, 10.0 mmol) and acetone (10 mL). The mixture was stirred at 21° C. until a homogeneous solution was achieved and then NaI (1.65 g, 11.0 mmol) was added. The vial was sealed with a PTFE lined cap and allowed to stir for 24 hours. The reaction mixture was cooled to −10° C. then filtered to remove any solids. Volatile solvent was removed under a stream of nitrogen gas. The molecular structure of the resulting oil was confirmed by $^1$H and $^{13}$C NMR.

Preparative Example 4

1-Benzyl-3-methylimidazolium diiodochlorate (CAT-7) was prepared in two steps starting from 1-methyl imidazole, benzyl chloride, and iodine. The synthetic procedure employed was a follows: A 50 ml amber jar was charged with benzyl chloride (25.34 g, 200.2 mmol) and 1-methyl-imidazole (16.42 g, 200.0 mmol). The solution was stirred at 22° C. for 5 minutes, and then the bottle was then places in an oven set to 120° C. for 1 hour to react. After cooling to 22° C., an extremely viscous yellow material was recovered. $^1$H and $^{13}$C NMR analysis were performed and confirmed that 1-benzyl-3-methylimadazolium chloride had been formed quantitatively. 3.09 g (14.8 mmol) of the 1-benzyl-3-methyl-imidazolium chloride was mixed with 3.75 g (14.8 mmol) iodine at 22° C. to synthesize the diiodochlorate anion. After mixing a homogeneous, free-flowing, dark red oil was obtained. $^1$H and $^{13}$C NMR analysis confirmed the molecular structure of the desired product.

Preparative Example 5

1-Benzyl-3-methylimidazolium hexaiodochlorate (CAT-8) was prepared as follows: 2.15 g (10.3 mmol) of the 1-benzyl-3-methyl-imidazolium chloride from preparative example 4 was mixed with 8.60 g (33.9 mmol) I$_2$ to make a 1:4 by mass solution of the ionic liquid and iodine. After mixing a homogeneous dark purple oil was obtained. $^1$H and $^{13}$C NMR analysis confirmed the molecular structure of the desired product.

I. Elemental Iodine Mediated Benzoxazine Polymerization

Comparative Example 1 (CE 1)

Approximately 0.0093 grams of BZ-1 were heated in TA differential scanning calorimeter at the rate of 10° C./min, starting from room temperature and up to 330° C. DSC trace revealed an exotherm with a high temperature peak at approximately 218° C. and an onset at about 203° C. The total energy released during the cure was 263 J/gram. A summary of the DSC data is contained in Table 2

Examples 1-5

Various amounts of elemental iodine per Table 1, corresponding to 1 wt. %, 2 wt. %, 4 wt. %, 6 wt. % and 10 wt. % were dissolved at room temperature in molten BZ-1 previously pre-melted at 80° C. for 10 minutes. Aliquots of those solutions were then heated at the rate of 10° C./min in a TA Instruments DSC. A summary of the DSC data is contained in Table 2 below.

TABLE 1

Composition of Samples in Examples 1-5

| Example No. | BZ-1 (grams) | $I_2$ (grams) | Wt. % $I_2$ |
|---|---|---|---|
| 1 | 1.0 | 0.01 | 1 |
| 2 | 1.0 | 0.02 | 2 |
| 3 | 1.0 | 0.04 | 4 |
| 4 | 1.0 | 0.06 | 6 |
| 5 | 1.0 | 0.10 | 10 |

Example 6

8.1 mg of a 2 wt. % solid solution of CAT-1 in BZ-2, prepared by thoroughly grinding the two materials together in an agate mortar and pestle, were heated in a TA differential scanning calorimeter at the rate of 10° C./min, starting from room temperature and up to 330° C. DSC trace revealed an endotherm with a minimum at 52° C., onset at 49° C. and energy consumption of 74 J/g corresponding to melting transition of the monomer. DSC trace also showed a Bactrian-shaped ("two-humped") exotherm with a lower temperature peak at 110 C with an onset of 83 C and a high temperature peak at approximately 196° C. and an onset at approximately 162° C. The total energy released during the cure was 326 J/gram. A summary of the DSC data is contained in Table 2

Example 7

A sample composition from Example 5 that was heated to 100° C. and held at that temperature for 10 minutes was then dissolved in deuterated dimethyl sulfoxide (dmso-d6) and analyzed using proton, carbon, single- and multi-bond correlation NMR. The collected spectra suggested the presence of several new ring-opened species in addition to the starting monomer. The species of even multiplicity with resonances in the 3-4 ppm region in the proton dimension corresponded to the familiar methylene bridges between the aromatic rings (p,p' for contours with 3.9/40 ppm $^1H/^{13}C$ coordinates and o,p' for the 3.8/35 ppm methylene bridge). The species with odd multiplicity contours with 3 ppm and 2.7 ppm signals corresponded to the methyl groups in mono-N-methyl benzyl aniline and N,N-dimethyl aniline, respectively. Other even multiplicity contours with proton signals in the 4 to 4.5 ppm range corresponded to the ring-opened secondary amine structures with a general 2-hyrdoxybenzyl aniline motif and low oligomers thereof with monomeric and ring opened structures.

Example 8

10 wt. % CAT-1 in BZ-2 sample was prepared according to the procedure outlined in Example 6. That sample was then dissolved in dmso-d6 and analyzed via NMR similarly to Example 7 to reveal partial ring opening as manifested by the diminishing of the methylene-oxazine integrals in $^1H$ spectra from 2.0 to 1.65, indicating about 20% of the benzoxazine ring opening. The room-temperature ring opened species appear to be dimerized benzoxazines and secondary hydroxybenzylaniline amines witnessed earlier.

II. Halide Mediated Benzoxazine Polymerization

Comparative Example 2 (CE 2)

5.2 mg of the 2 wt. % CCAT-1 solution in BZ-1 prepared according to the method outlined for Examples 1-5 were heated in TA differential scanning calorimeter at the rate of 10° C./min, starting from room temperature and up to 330° C. DSC trace revealed an exotherm with a high temperature peak at approximately 218° C. and an onset at about 204° C. The total energy released during the cure was 257 J/gram. A summary of the DSC data is contained in Table 2

Comparative Example 3 (CE 3)

6.2 mg of the 2 wt. % CCAT-2 solution in BZ-1 prepared according to the method outlined for Examples 1-5 were heated in TA differential scanning calorimeter at the rate of 10° C./min, starting from room temperature and up to 330° C. DSC trace revealed an exotherm with a high temperature peak at approximately 216° C. and an onset at about 202° C. The total energy released during the cure was 264 J/gram. A summary of the DSC data is contained in Table 2

Example 9

6.9 mg of the 2 wt. % CAT-2 solution in BZ-1 prepared according to the method outlined for Examples 1-5 were heated in TA differential scanning calorimeter at the rate of 10° C./min, starting from room temperature and up to 330° C. DSC trace revealed an exotherm with a high temperature peak at approximately 192° C. and an onset at about 157° C. The total energy released during the cure was 356 J/gram. A summary of the DSC data is contained in Table 2

Comparative Example 4 (CE 4)

Approximately 6.1 mg of BZ-2 were heated in TA differential scanning calorimeter at the rate of 10° C./min, starting from room temperature and up to 330° C. DSC trace revealed no discernable exotherm and two endotherms. The first one, with a minimum at 53° C., onset at 50° C. and energy consumption of 373 J/g corresponded to melting transition of the monomer. The total energy required for the polymerization of this monomer was 297 J/gram, and that endotherm had a W-shaped curve, with local minima at 193° C. and 227° C. with the onset at 150° C. A summary of the DSC data is contained in Table 2

Example 10

6.2 mg of the 2 wt. % solid solution of CAT-2 in BZ-2, prepared by thoroughly grinding the two materials together in an agate mortar and pestle, were heated in TA differential scanning calorimeter at the rate of 10° C./min, starting from room temperature and up to 330° C. DSC trace revealed an endotherm with a minimum at 53° C., onset at 50° C. and energy consumption of 82 J/g corresponding to melting transition of the monomer. It also revealed a polymerization exotherm with a high temperature peak at approximately 203° C. and an onset at about 179° C. The total energy released during the cure was 265 J/gram. A summary of the DSC data is contained in Table 2

Example 11

5.8 mg of the 2 wt. % CAT-4 solution in BZ-1 prepared according to the method outlined for Examples 1-5 were heated in TA differential scanning calorimeter at the rate of 10° C./min, starting from room temperature and up to 330° C. DSC trace revealed an m-shaped exotherm with a high temperature peak at approximately 192° C. and an onset at about 154° C. and a lower temperature peak at 105° C. The total energy released during the cure was 377 J/gram. A summary of the DSC data is contained in Table 2

Example 12

7.71 mg of a 2 wt. % suspension of CAT-3 in BZ-1, prepared by thoroughly mixing the two materials together in a glass vial, were heated in TA instruments differential scanning calorimeter at the rate of 10° C./min, starting from room temperature and up to 325° C. The trace of relative heat flow against temperature revealed two exothermic events with maxima at 113° C. and 202° C., with onset temperatures of 81° C. and 177° C. respectively. The total energy released during the cure was 308 J/gram. A summary of the DSC data is contained in Table 2.

Example 13

4.9 mg of the 2 wt. % CAT-6 solution in BZ-1 prepared according to the method outlined for Examples 1-5 were heated in TA differential scanning calorimeter at the rate of 10° C./min, starting from room temperature and up to 330° C. DSC trace revealed a single peak exotherm with a maximum at approximately 204° C. and an onset at about 179° C. The total energy released during the cure was 286 J/gram. A summary of the DSC data is contained in Table 2

Example 14

4.59 mg of a 5 wt. % solution of CAT-7 in BZ-1, prepared by thoroughly mixing the two materials together in a glass vial, were heated in TA instruments differential scanning calorimeter at the rate of 10° C./min, starting from room temperature and up to 300° C. The trace of relative heat flow against temperature revealed two overlapping exothermic events with maxima at 113° C. and 195° C., with an initial onset temperature of 79° C. The total energy released during the cure was 375 J/gram. A summary of the DSC data is contained in Table 2.

Example 15

4.9 mg of the 5 wt. % CAT-8 solution in BZ-1 prepared by thoroughly mixing the two materials together in a glass vial, were heated in TA differential scanning calorimeter at the rate of 10° C./min, starting from room temperature and up to 300° C. The trace of relative heat flow against temperature revealed two overlapping exothermic events with maxima at 109° C. and 190° C., with an initial onset temperature of 76° C. The total energy released during the cure was 296 J/gram. A summary of the DSC data is contained in Table 2.

TABLE 2

Summary of Halides Effect on Cure of Benzoxazine: Exotherm Characteristics

| Example | Catalyst | BZ | Catalyst wt. % | $T_{low}$ Peak (° C.) | $T_{low}$ Energy (J/g) | $T_{high}$ Peak (° C.) | $T_{high}$ Energy (J/g) | Total Energy Released (J/g) |
|---|---|---|---|---|---|---|---|---|
| CE 1 | none | BZ-1 | 0 | — | — | 218 | 263 | 263 |
| CE 2 | CCAT-1 | BZ-1 | 2 | — | — | 218 | 263 | 263 |
| CE 3 | CCAT-2 | BZ-1 | 2 | — | — | 216 | 264 | 264 |
| CE 4* | none | BZ-2 | 0 | — | — | — | — | — |
| 1 | CAT-1 | BZ-1 | 1 | 98 | 4 | 194 | 333 | 337 |
| 2 | CAT-1 | BZ-1 | 2 | 110 | 15 | 194 | 226 | 333 |
| 3 | CAT-1 | BZ-1 | 4 | 105 | 48 | 194 | 197 | 359 |
| 4 | CAT-1 | BZ-1 | 6 | 106 | 65 | 195 | 155 | 356 |
| 5 | CAT-1 | BZ-1 | 10 | 103 | 132 | 187 | 41 | 278 |
| 9 | CAT-2 | BZ-1 | 2 | 99 | 5 | 192 | 337 | 342 |
| 6 | CAT-1 | BZ-2 | 2 | 110 | 57 | 196 | 202 | 326 |
| 10 | CAT-2 | BZ-2 | 2 | 121 | 20 | 203 | 265 | 285 |
| 11 | CAT-4 | BZ-1 | 2 | 105 | 15 | 192 | 307 | 377 |
| 12 | CAT-3 | BZ-1 | 2 | 113 | 9 | 202 | 294 | 308 |
| 13 | CAT-6 | BZ-1 | 2 | — | — | 204 | 286 | 286 |
| 16 | CAT-5 | BZ-1 | — | — | — | 204 | 300 | 300 |
| 17 | CAT-5 | BZ-2 | — | 101 | — | 180, 253 | — | 295 |
| 18 | CAT-5 | BZ3 | — | 119 | — | 168, 275 | — | 348 |
| 14 | CAT-7 | BZ-1 | 5 | 113 | — | 195 | — | 375 |
| 15 | CAT-8 | BZ-1 | 5 | 109 | — | 190 | — | 296 |

*only endothermic events were observed for CE 4

DSC data illustrated that simple halide salts showed minimal/no catalytic effect on benzoxazine polymerization. Elemental halogens or anionic polyhalides, however, proved to be effective, even at low (e.g., 1 wt. %) concentrations. At the same time, DSC illustrated how a simple adjustment of the catalytic loading allowed for enhanced control over the sequence of the benzoxazine polymerization by tuning the amount of low temperature ring opening at the expense of the higher temperature rearrangement.

Elemental Bromine Mediated Benzoxazine Polymerization

Example 16

Five drops of elemental bromine were added dropwise to molten BZ-1 preheated at 80° C. for 10 minutes. Violent exothermic reaction accompanied by bubbling ensued immediately upon the contact of the reactants. The contact regions changed color from yellow to red to brown as they solidified. An aliquot of that solid was then heated at the rate of 10° C./min in a TA Instruments DSC. A summary of the DSC data is contained in Table 2.

Example 17

Five drops of elemental bromine were added dropwise to molten BZ-2 preheated at 80° C. for 10 minutes and stirred. Violent exothermic reaction accompanied by bubbling ensued immediately upon the contact of the reactants. The contact regions changed color from yellow to red to brown as they solidified. An aliquot of that solid was then heated at the rate of 10° C./min in a TA Instruments DSC. A summary of the DSC data is contained in Table 2.

Example 18

Five drops of elemental bromine were added finely powdered BZ-3 at room temperature. Violent exothermic reaction accompanied by bubbling ensued immediately upon the contact of the reactants. The contact regions changed color from yellow to red to brown. Please refer to the accompanying real time video recording of that reaction attached to the present disclosure. An aliquot of that product was then heated at the rate of 10° C./min in a TA Instruments DSC. A summary of the DSC data is contained in Table 2.

Aliquots of samples from Examples 16-18 were collected, individually dissolved in deuterated dimethyl sulfoxide and analyzed via single and multi-bond correlated NMR as with the previous samples. In all cases, the spectra indicate substantial benzoxazine ring opening taking place upon room temperature introduction of bromine. For the liquid benzoxazines, the remaining unconverted monomer was the minor species: ¾ conversion for the BZ-2 (pCr-a BZ) and nearly ⅔ conversion for the BZ-1 (Ph-a BZ) benzoxazines. Even for the solid bis-F benzoxazine, over a quarter of the monomer was ring opened at room temperature. The presence of the rearranged "final" benzoxazine structure was seen in HSQC NMR upon room temperature addition only. Thus, in FIGS. 8 and 9 below, the familiar even multiplicity contours consistent with the methylenes bridging cresols and anilines in o,o'; o,p' and p,p' positions were readily observed. The Effect of $I_2$ Catalyzed Polymerization on the Glass Transition Temperature of Polybenzoxazines Comparative Example 5 (CE 5)

10.00 g of BZ-3, finely ground, was placed in a flat-bottomed thin gauge aluminum pan 70 mm diameter and placed in an air-circulating oven. The sample was cured for 1 hour at 150° C., and 1 hour at 175° C. ramping at a rate of 5° C./min between set points. The sample was allowed to cool at a rate of 20° C./min in the oven to 40° C. The sample was red, transparent and glossy in appearance and mechanically stiff. The sample was cut into strips with approximate dimensions of 40 mm×12.5 mm×2 mm for DMA measurement of the stiffness (E') and glass transition temperature (tan δ peak) in three point bend geometry. Table 5 summarizes the DMA data.

Example 19

9.80 g of BZ-3 and 0.20 g CAT-1 were placed in a ceramic mortar and pestle and ground into a homogeneous powder. During grinding CAT-1 seemed to dissolve into BZ-3 and become a homogeneous solid solution. The powder was transferred to a flat-bottomed thin gauge aluminum pan 70 mm diameter and placed in an air-circulating oven. The sample was cured for 1 hour at 150° C., and 1 hour at 175° C. ramping at a rate of 5° C./min between set points. The sample was allowed to cool at a rate of 20° C./min in the oven to 40° C. The sample was red, transparent and glossy in appearance and mechanically stiff. The sample was cut into strips with approximate dimensions of 40 mm×12.5 mm×2 mm for DMA measurement of the stiffness (E') and glass transition temperature (tan δ peak) in three point bend geometry. Table 5 contains a summary the DMA data.

TABLE 5

Summary of DMA data

| Example | E' onset (° C.) | E" max (° C.) | Tan(δ) max (° C.) |
|---|---|---|---|
| CE 5 | 134 | 131 | 154 |
| 19 | 146 | 145 | 168 |

Comparing the data for Example 19 and CE-5 in Table 5, it can be seen that the addition of a catalytic amount of $I_2$ (2.0 wt. %, 3.4 mole %) resulted in a cured material that displayed a glass transition temperature 14° C. higher when compared to the uncatalyzed polybenzoxazine under identical cure conditions. These data in conjunction with NMR data at short polymerization times suggested that $I_2$ acted as an effective substoichiometric curative for polymerization and substantially shortened cure cycles needed to produce high conversion polymers.

What is claimed is:

1. A polymerizable composition comprising:
   a) a benzoxazine, and
   b) an elemental halogen or an onium polyhalide catalyst, wherein the onium polyhalide is of the formula $Q^+X_{(2n+1)}^-$, 

where 1≤n≤4,
   Q is onium group, selected from ammonium, sulfonium and phosphonium; and
   each X is a halide, and when the composition is heated, produces a poly(benzoxazine).

2. The composition of claim 1 wherein the elemental halogen is used in amounts of 0.5 to 20% by mass relative to the total composition.

3. The composition of claim 1 wherein the onium polyhalide is used in 0.5 to 20% by mass relative to the total composition.

4. The composition of claim 1 wherein the onium polyhalide is of the formula $Q^+X_{(2n+1)}^-$, 

where 1≤n≤4,
   Q is onium group, selected from ammonium, sulfonium and phosphonium; and
   each X is a halide.

5. The composition of claim 4 wherein Q is selected from ammonium groups of the formula $(R^1)_4N^+$, sulfonium groups of the formula $(R^1)_3S^+$ or phosphonium groups of the formula $(R^1)_4P^+$,
   wherein each $R^1$ is independently H, alkyl, aryl, or combinations thereof with the proviso that no more than one $R^1$ is H.

6. The composition of claim 4 wherein Q is an ammonium group selected from the group consisting of a pyridinium, pyrrolidinium or imidazolium group.

7. The composition of claim 6 wherein Q is an ammonium group selected from the group consisting of a pyridinium, pyrrolidinium or imidazolium group of the formulas:

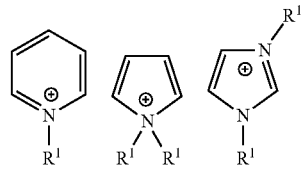

wherein each $R^1$ is independently H, alkyl, aryl, or combinations thereof with the proviso that no more than one $R^1$ is H.

8. The composition of claim 6 wherein Q is $(R^1)_4N^+$, wherein each $R^1$ is independently H, alkyl, aryl, or combinations thereof with the proviso that no more than one $R^1$ is H.

9. The composition of claim 4 wherein subscript n is 2.

10. The composition of claim 1 wherein said benzoxazine compound comprises at least one ring of the formula:

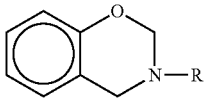

where R is a (hetero)hydrocarbyl group.

11. The polymerizable composition of claim 10 wherein said benzoxazine is of the formula:

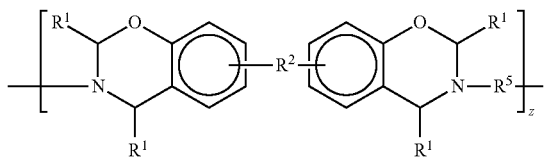
IV wherein
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound;
$R^5$ is the residue of a primary amino compound;
z is at least 1.

12. The polymerizable composition of claim 10 where the benzoxazine is of the formula:

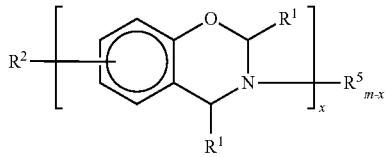

wherein
each $R^1$ is H or an alkyl group, and is the residue of an aliphatic aldehyde,
$R^2$ is H, a covalent bond, a phenol or a polyvalent (hetero)hydrocarbyl group, preferably H, a covalent bond or a divalent alkyl group;
$R^5$ is (hetero)hydrocarbyl residue of a primary amino compound, with the proviso that $R^2$ is not H when subscript x is >1; and
subscript m is 1 to 4.

13. The polymerizable composition of claim 1 comprising a mixture of two or more benzoxaxines.

14. The polymerizable composition of claim 1 comprising a benzoxazines derived from poly(alkyleneoxy) diamines.

15. The polymerizable composition of claim 1, further comprising a co-curative.

16. The polymerizable composition of claim 15 wherein the co-curative is of the formula:

$$R^{30}-(ZH)_p \qquad (XII)$$

wherein, in Formula (XII):
$R^{30}$ is a (hetero)hydrocarbyl group;
each Z is independently —S— or $NR^{31}$, where $R^{31}$ is H or a hydrocarbyl group, including aryl and alkyl; and
p is 1 to 6 (in certain embodiments, p is at least 2).

17. The polymerizable composition of claim 16, wherein the ratio of the sum of amine and/or thiol groups from the compound $R^{30}-(ZH)_p$, to the benzoxazine groups is about 3:1 to 100:1.

18. The polymerizable composition of claim 15 wherein the co-curative is of the formula:

$$R^{30}(NHR^{31})_p$$

wherein, $R^{30}$ is a (hetero)hydrocarbyl group;
$R^{31}$ is H or a hydrocarbyl group, including aryl and alkyl; and
p is 1 to 6.

19. The polymerizable composition of claim 15 wherein the co-curative is of the formula: $R^{30}-(SH)_p$
wherein, $R^{30}$ is a (hetero)hydrocarbyl group; and
p is 1 to 6.

* * * * *